Jan. 5, 1960   P. T. HUGHES   2,919,771
VEHICLE WHEEL BRAKES
Filed Oct. 13, 1958   2 Sheets-Sheet 2
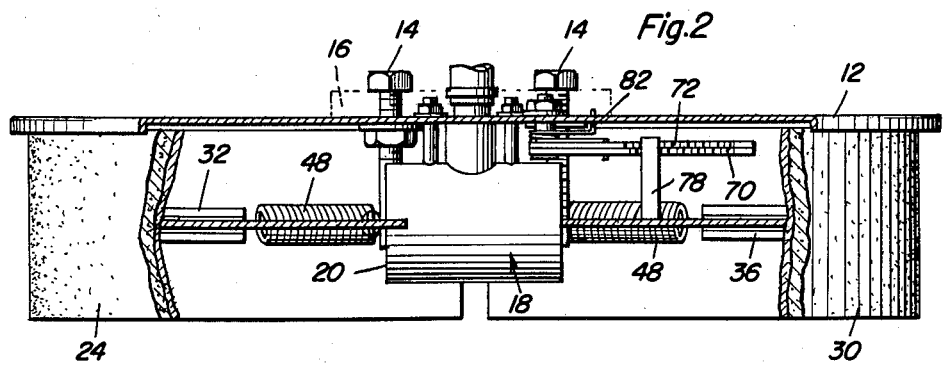
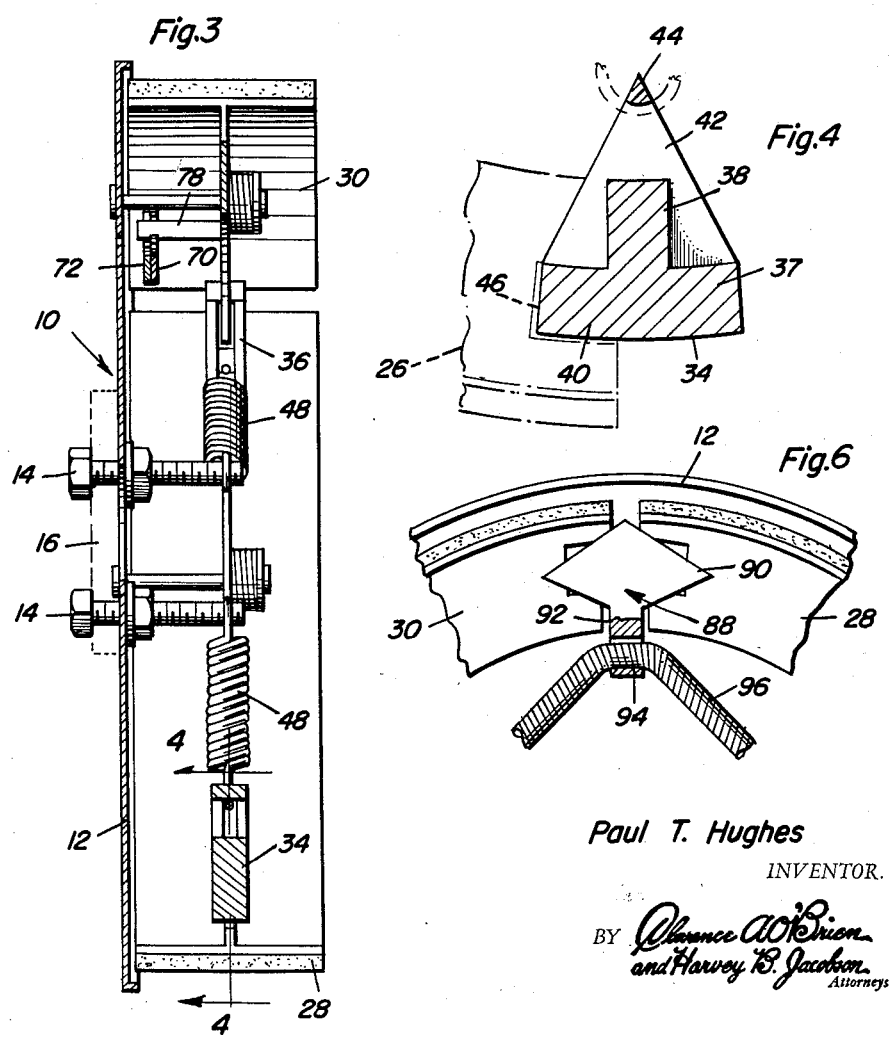
Paul T. Hughes
INVENTOR.

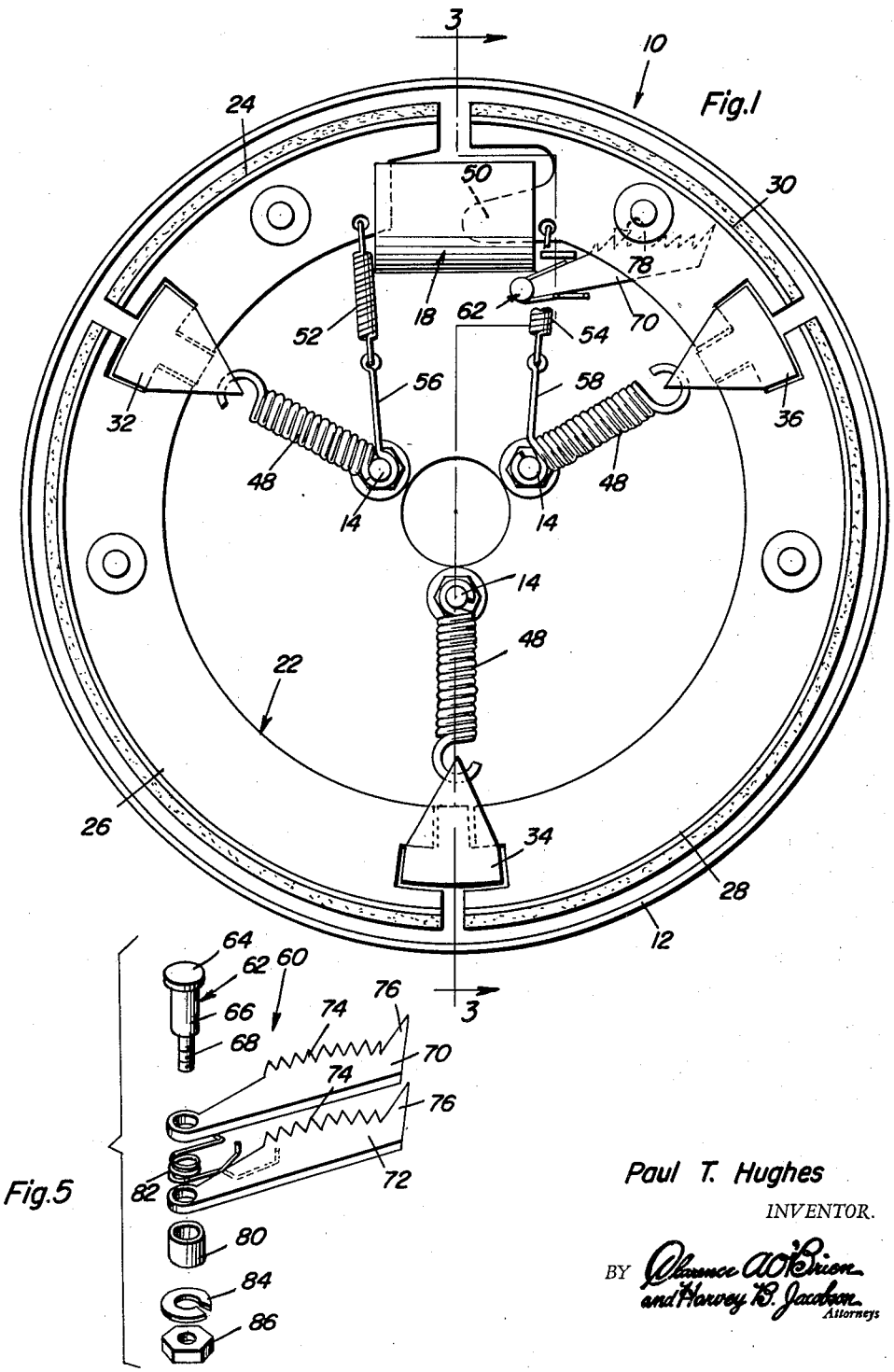

United States Patent Office 2,919,771
Patented Jan. 5, 1960

2,919,771

VEHICLE WHEEL BRAKES

Paul T. Hughes, Vona, Colo.

Application October 13, 1958, Serial No. 766,854

1 Claim. (Cl. 188—78)

This invention relates in general to new and useful improvements in brake construction, and more specifically to improved vehicle wheel brakes.

In the normal vehicle wheel brake construction, the brake shoes are two in number and are secured to the backing plate for rotation about pivots remote from a wheel cylinder. Because of this mode of support, unless properly adjusted, the brake shoe does not completely engage the brake drum when the vehicle wheel brake is actuated. Inasmuch as the braking power is dependent upon the amount of contact surface between the brake shoes and the brake drum, this results in a decrease in the effectiveness of the vehicle wheel brake.

It is therefore the primary object of this invention to provide an improved vehicle wheel brake which includes a substantially circular brake shoe unit, which unit is formed in interconnected sections freely suspended from the backing plate whereby when the vehicle brakes are applied, the brake shoe unit will be expanded by the action of the wheel cylinder into complete contact with the brake drum.

Another object of this invention is to provide an improved brake shoe arrangement for vehicle brakes, the brake shoe arrangement including a substantially circular brake shoe unit formed of a plurality of individual sections, the sections being connected together for movement together by means of connectors, the connectors being suspended from the backing plate by means of springs whereby the brake shoe unit is retained in a centered position and is free for expansion into complete engagement with a brake drum.

Another object of this invention is to provide an improved vehicle wheel brake wherein the wheel cylinder includes a single piston and the brake shoe arrangement is in the form of a substantially circular brake shoe unit which extends continuously from the wheel cylinder in a circular pattern around and into engagement with the piston of the wheel cylinder, the brake shoe unit being formed in a plurality of sections which are freely mounted whereby as the piston is moved to actuate the wheel brake, the brake shoe unit is expanded into complete engagement with a brake drum.

A further object of this invention is to provide an improved automatic adjusting means for a vehicle wheel brake, the adjusting means including a pair of dogs disposed on opposite sides of a brake shoe and engaging a finger, the dogs each including a plurality of teeth with the teeth being disposed out of phase whereby a more minute adjustment may be obtained.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the vehicle wheel brake with the brake drum omitted and shows the particular arrangement of the brake shoes, the adjusting means and the wheel cylinder;

Figure 2 is a top plan view of the vehicle wheel brake of Figure 1 with upper portions of the brake shoes being broken away for the purpose of illustrating the details of the vehicle wheel brake;

Figure 3 is a vertical sectional view taken substantially upon the plane indicated by the section line 3—3 of Figure 1 and shows the manner in which the brake shoe positioning springs are attached to the bolts which are used for the purpose of mounting the backing plate on either the wheel spindle or the rear axle housing;

Figure 4 is an enlarged fragmentary sectional view taken substantially upon the plane indicated by the section line 4—4 of Figure 3 and shows further the details of a connector for connecting together the brake shoe sections, one of the brake shoe sections being shown in phantom lines;

Figure 5 is an exploded perspective view of the details of the adjusting means; and Figure 6 is a fragmentary elevational view showing a modified form of spring support for the brake shoe unit, the view being rotated from its normal position.

Referring now to the drawings in detail, it will be seen that there are illustrated the details of the vehicle wheel brake which is the subject of this invention, the vehicle wheel brake being referred to in general by the reference numeral 10. The vehicle wheel brake 10 includes a backing plate 12 which is secured to either a front wheel spindle plate or a plate on a rear axle housing by means of bolts 14. The plate is referred to by the reference numeral 16 and is illustrated in Figures 2 and 3.

Suitably mounted on the outer surface of the backing plate 12 adjacent the top thereof is a wheel cylinder 18 of a hydraulic brake system. The wheel cylinder 18 is of the single piston type, the end 20 of the wheel cylinder 18 being closed and providing an abutment for a brake shoe. Inasmuch as the wheel cylinder 18 is of a conventional type and will be a part of the conventional hydraulic brake system, no further description of the wheel cylinder 18 is believed to be necessary.

Also carried by the backing plate 12 is a brake shoe unit which is referred to in general by the reference numeral 22. The brake shoe unit 22 is formed by a plurality of individual brake shoe sections which in the preferred form are four in number. The brake shoe sections include a brake shoe section 24, a brake shoe section 26, a brake shoe section 28 and a brake shoe section 30. The brake shoe sections 24 and 26 are connected together by a connector 32. The brake shoe sections 26 and 28 are connected together by a connector 34. A third connector 36 connects together the brake shoe sections 28 and 30.

The connectors 32, 34 and 36 are identical and, as is best illustrated in Figure 4, each of the connectors includes a generally T-shaped web 37 which is formed by a radially extending stem 38 and a generally circumferentially extending crossbar 40. Disposed at opposite ends of the web 37 and generally parallel to the plane of the backing plate 12 is a pair of side plates 42. The innermost ends of the side plates 42 are connected together by means of a bar 44.

Each of the brake shoe sections 24, 26, 28 and 30 is provided in the end thereof with a notch, such as the notch 46 illustrated in Figure 4. The notch 46 receives one end of the crossbar 40 and permits the adjacent portions of the brake shoe section to be disposed between the side plates 42.

In order that the brake shoe unit 22 may be freely supported by the backing plate 12, there is engaged with each of the crossbars 44 a coil spring 48. The coil springs 48 are disposed in radiating relation and have their inner ends connected to the bolts 14 in the manner best illustrated in Figures 1 and 3. This provides a resilient mounting for the brake shoe unit 22. The brake shoe unit 22 is substantially circular in extent and the end of the brake shoe section 24 remote from the connector 32 is in abutment with the end 20 of the wheel cylinder 18. The brake shoe section 30 is provided at the end thereof remote from the connector 36 with a projecting part 50 which projects into the cylinder 18 and engages the piston (not shown) thereof. Thus when the wheel cylinder 18 is actuated, the brake shoe section 30 is urged outwardly and to the right, as viewed in Figure 1, which results in the entire brake shoe unit 22 being expanded into complete engagement with the brake drum (not shown) of the vehicle wheel brake 10.

Although the springs 48 have a tendency to insure the return of the brake shoe unit 22 when the pressure within the wheel cylinder 18 is released, there are also provided return springs 52 and 54 which are connected to the brake shoe sections 24 and 30 adjacent the wheel cylinder 18. The return springs 52 and 54 are provided with connectors 56 and 58, respectively, which engage the bolts 14.

In order that the brake shoe unit 22 may automatically be adjusted, there are provided automatic adjusting means which are referred to in general by the reference numeral 60. The automatic adjusting means 60 are best illustrated in Figure 5 and include an elongated mounting stud 62 having a head 64, a bearing portion 66 and a threaded end portion 68. Rotatably journaled on the bearing portion 62 is a pair of ratchets 70 and 72. Each of the ratchets 70 and 72 includes a plurality of longitudinally spaced teeth 74 and a large end tooth 76. The end teeth 76 prevent the disengagement of the ratchets 70 and 72 with a pawl 78 carried by the brake shoe section 30 and the teeth 74 of the two ratchets 70 and 72 normally engage the pawl 78 to hold the brake shoe unit 22 in an adjusted position. The teeth 74 of the two ratchets 70 and 72 are disposed out of phase so that a more minute adjustment may be obtained.

In order that the ratchets 70 and 72 may be spaced from the backing plate 12 to prevent binding, there is also provided a spacer 80 which is carried by the bearing portion 66 of the stud 62. Further, there is carried a spring 82 which engages the ratchets 70 and 72 and urges them into engagement with the pawl 78. One end of the spring 82 is anchored to the backing plate 12. The stud 62 is retained in place on the backing plate 12 by having the threaded portion 68 thereof passed through the backing plate 12 and a washer 84 and a nut 86 is mounted thereon.

Referring now to Figure 6 in particular, it will be seen that there is illustrated a modified form of connector and spring assembly for the brake shoe unit 22. For illustrative purposes, the brake shoe sections 30 and 28 are illustrated. The connector is referred to in general by the reference numeral 88 and includes a pair of generally diamond shaped side plates 90 which are disposed on opposite sides of a T-shaped web 92 which corresponds generally to the web 37. However, the stem of the web 92 projects outwardly and is provided with a bore 94 therein. Passed through the bore 94 is an elongated coil spring 96 of the type generally used in conjunction with screen doors. The coil spring 96 passes through all of the connectors of the brake shoe unit and has the ends thereof suitably anchored either to the backing plate or to the wheel cylinder. In either event, the connections for the ends of the spring 96 will be adjacent the wheel cylinder.

In view of the foregoing, it will be readily apparent that there has been devised a highly desirable vehicle wheel brake assembly wherein the brake shoes thereof are of such an extent whereby the brake shoes will obtain a maximum engagement with the brake drum and at the same time the brake shoes are so formed in sections and so interconnected whereby complete engagement of the brake shoe unit with the wheel drum, when the brake shoe unit is actuated, is assured.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a vehicle wheel brake, a backing plate, bolts extending through said backing plate for mounting said backing plate against rotation, a wheel cylinder fixedly mounted on said backing plate, a generally circular brake shoe unit having spaced ends disposed at opposite ends of said wheel cylinder for separation thereby, means supporting said brake shoe unit relative to said backing plate, said brake shoe unit including a plurality of independent brake shoe sections, and connectors disposed between and connecting together said brake shoe sections, said connectors being generally T-shaped in cross section and having legs seated in oposite ends of said brake shoe sections.

References Cited in the file of this patent

UNITED STATES PATENTS

| | | |
|---|---|---|
| 1,932,899 | La Brie | Oct. 31, 1933 |
| 1,946,032 | Parker | Feb. 6, 1934 |
| 2,038,213 | Frank | Apr. 21, 1936 |
| 2,117,288 | Blucher | May 17, 1938 |
| 2,192,293 | Waseige | Mar. 5, 1940 |
| 2,493,177 | Williams | Jan. 3, 1950 |